Inventors:
Donald K. Fleming, Sarabjit S. Randhava
+ Elias H. Camara
By Molinare, Allegretti, Newitt & Witcoff Attys.

Inventors:
Donald K. Fleming
Sarabjit S. Randhava
Elias H. Camara
By Molinare, Allegretti,
Newitt & Witcoff
Attys.

United States Patent Office 3,787,468
Patented Jan. 22, 1974

3,787,468
METHANATION OF CARBON MONOXIDE AND CARBON DIOXIDE
Donald Kingsley Fleming, Park Ridge, Sarabjit Singh Randhava, Evanston, and Elias Humberto Camara, Hickory Hills, Ill., assignors to Institute of Gas Technology
Filed Sept. 1, 1970, Ser. No. 68,632
Int. Cl. C07c 1/02, 1/04, 1/12
U.S. Cl. 260—449 M                     6 Claims

ABSTRACT OF THE DISCLOSURE

Process of preferential, selective and sequential methanation for reaction of gases containing CO, and/or $CO_2$ in the presence of hydrogen, using catalysts of Rh and Ru metals, and alloys thereof with Pt, beneficiated with admixtures of tungsten oxide. Precise control of the product gas composition is obtained by predetermined control of process parameters of input gas flow rate and temperature conditions in the methanation reactor. Product gas containing substantially no CO is useful in ammonia synthesis and fuel cells.

FIELD OF THE INVENTION

This invention relates to improved methods of, and catalyst for, reacting carbon monoxide and/or carbon dioxide with hydrogen to form methane and water. More specifically, this invention relates to the method of use of multi-component catalysts containing ruthenium or rhodium, with or without platinum, which catalysts are beneficated with tungsten oxide.

BACKGROUND OF THE PRIOR ART

Heretofore, many kinds of metallic catalyst have been utilized in various supported and non-supported forms to promote the reaction of carbon monoxide and carbon dioxide with hydrogen to form methane and water. These reactions are the basis of the standard Fischer-Tropsch reaction for the synthesis of hyldrocarbons from carbon monoxide or carbon dioxide and hydrogen. In addition, these same reactions are employed in the clean-up reformer product gases before introduction into fuel cells, or before nitrogenation in ammonia synthesis plants. Heretofore, however, most of these catalysts primarily nickel-based, have operated at relatively high temperatures, about 400° C., and do not preferentially methanate CO in the presence of $CO_2$. In addition, they require a relatively large reactor size, and the reaction was relatively severe.

In a different field, multi-component fuel cell electrodes under conditions of electrical potential have been used to oxidize hydrogen with oxygen in the presence of a sulfuric acid electrolyte in the presence of carbon monoxide impurites. For example, the U.S. Pat. 3,357,863 discloses the use of rhodium catalyst containing tungsten oxide as such an electrode at 150° C. in the presence of 10 percent carbon monoxide over a phosphoric acid electrolyte. The patent discloses up to 50 percent of the rhodium may be substituted by platinum or palladium. Similarly, in U.S. Pat. No. 3,364,072, 4-component electrode compositions of platinum and rhodium with tungsten and molybdenum oxide additives are disclosed as showing improved fuel cell performance in terms of current density at relatively lower percent carbon monoxide impurity, 0.1–1.0 percent, and somewhat lower temperatures, on the order of 70° C. Again, hydrogen was used as the fuel, oxygen was used as the oxidant, the electrolyte was sulfuric acid, and the electrode was tested under various voltages ranging from .7 to .85 volts.

It was also known from these two aforementioned patents, that platinum black operated somewhat better as an electrode under some of the low carbon monoxide conditions than platinum beneficated by either the molybdenum oxide or tungsten oxide. These results tend to indicate that, typical of the field, the operability of electrode compositions is relatively unpredictable. In our own work evaluating such electrode compositions for operability in different gas feeds, specifically, a fuel containing 79.7 percent hydrogen, 20 percent carbon dioxide, and .3 percent carbon monoxide, it was determined that at steady state conditions of a test fuel cell at 150° C., there was no significant change in the carbon monoxide concentration in the fuel cell effluent as compared to the input feed. This is discussed in more detail in the comparative Examples 18–21 below. This work tends to indicate that there is no effective chemical reaction of CO in the operating fuel cell, the carbon monoxide concentration in the effluent agreeing with the value predicted by material balance, calculated on the basis of hydrogen consumed in the manufacture of the electricity in the fuel cell.

OBJECTS OF THE INVENTION

It is among the objects of this invention to provide a method for converting carbon monoxide and/or carbon dioxide to methane.

It is another object of this invention to provide a method for cleaning-up reformer gas which contains impurities of carbon monoxide and/or carbon dioxide to produce an improved product gas.

It is another object of this invention to provide a method of producing a product gas which may be utilized as an improved feed-gas for fuel cells, or for ammonia synthesis.

It is another object of this invention to provide improved methanation processes which have reduced operating temperatures, which mitigate the severity of the reaction, and minimize the reactor size.

It is another object of this invention to provide a process of, and catalyst for, selectively methanating carbon monoxide in the presence of carbon dioxide and hydrogen by control of process conditions.

It is another object of this invention to provide a method of, and catalyst for, methanating both the carbon monoxide and carbon dioxide simultaneously by control of process conditions.

It is another object of this invention to provide a methanation process which may be used alone, or in conjunction sequentially or simultaneously with electrochemical reactions which unlike the methanation process of this invention, may be under an electrical potential.

Still further objects of this invention will be evident from the detailed description which follows.

THE INVENTION

Summary

We have discovered methods of methtanating carbon monoxide and/or carbon dioxide by reaction with hydrogen by the use of rhodium or ruthenium metals having minor amounts of tungsten oxide admixed therewith, heretofore used as electrodes, as catalysts in said reactions when not under electrical potential. The rhodium and ruthenium may be used alone or in mixtures and with platinum. We prefer to use the metals with oxides without platinum. We have discovered, unexpectedly, that the minor amounts of tungsten oxide admixed with the rhodium and ruthenium have a synergistic effect in our process. In addition, the methanation activity is quite unexpected in view of the fact that tests show that there is no effective carbon monoxide chemical reaction in an operating fuel cell using such materials under electrical potential as electrodes.

The rhodium containing catalyst compositions employed in this method are not per se part of this invention, being heretofore known as electrode compositions. However, these rhodium-containing catalyst compositions have not been known or used as catalysts in the methanation, or selective methanation methods of this invention.

In contrast, the ruthenium-containing catalysts compositions employed herein have not been heretofore known or used and are per se part of this invention.

In contrast to the utility of platinum black as an effective electrode at low carbon monoxide concentrations as set forth in prior art, we have discovered that platinum is relatively inert in the methanation processes of this invention. We have discovered that the activity of our catalyst combinations follow the general rule: ruthenium plus tungsten oxide is the most active, followed by mixed catalysts of ruthenium with platinum and containing the aforesaid additive, followed by rhodium plus the same additive, followed by mixed catalysts of rhodium with platinum and containing the aforesaid additive. Precise control of the product gas composition resulting from our methanation processes can be obtained by predetermined and preselected control of the process parameters, particularly the input gas flow rates and the temperature conditions of the methanation reactor.

The figures

In the following detailed description, reference will be had to the drawings, in which.

Figure 5:
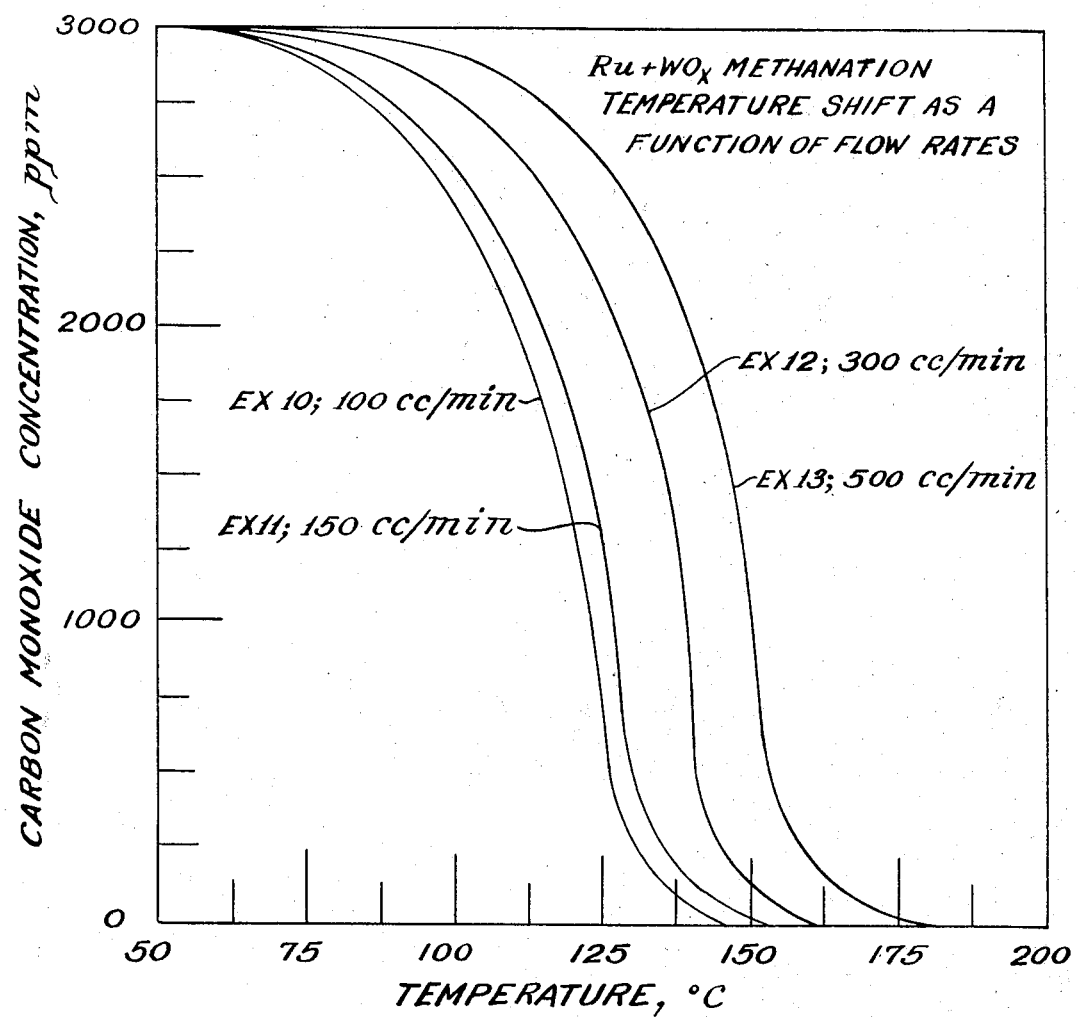
Figure 6:
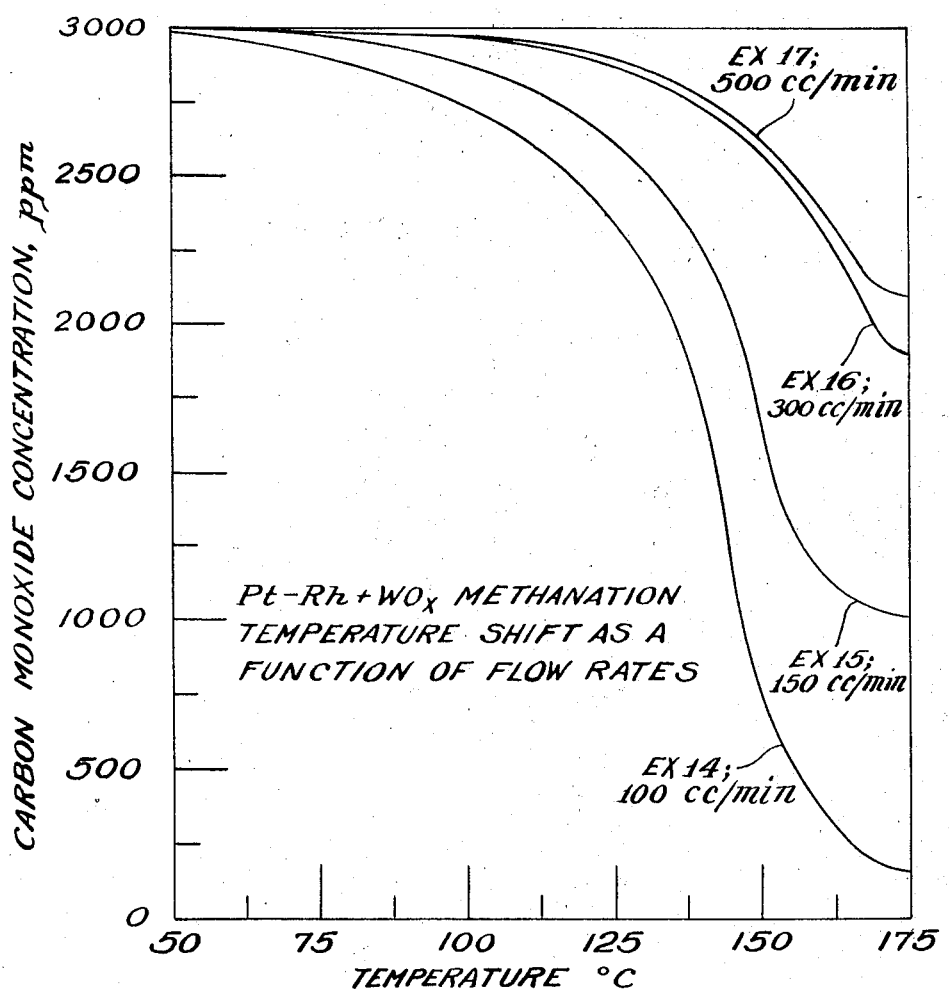

FIG. 5 graphically illustrates the temperature and flow rate relationship in control of the methanation reaction of this invention using tungsten oxide beneficiated ruthenium catalyst;

FIG. 6 is similar to FIG. 5 and graphically illustrates the flow rate and temperature relationship for a tungsten oxide beneficiated rhodium catalyst in the process of this invention.

Detailed description

We have discovered that certain known metallic materials used heretofore as electrodes, (Rh and Rh-Pt alloys beneficiated with $WO_x$), and certain metallic materials not heretofore known or used (Ru and Ru-Pt alloys beneficiated with $WO_x$) when employed in a methanation reactor as a catalyst, have the unexpected property of methanating carbon monoxide and carbon dioxide containing feed gases at temperatures within the range of 75 to 250° C., and preferably in the range of about 100–175° C. We have discovered that there is preferential selective methanation of carbon monoxide, followed by methanation of carbon dioxide in gases which contain both carbon monoxide and carbon dioxide, when the carbon monoxide has essentially been methanated. By control of the temperature and flow rate of the input gas in our process, we are able to selectively methanate carbon monoxide in the presence of the carbon dioxide without substantially methanating carbon dioxide.

We can then change the conditions in our reactor and thereafter methanate the carbon dioxide. In addition, gases containing only carbon dioxide can also be methanated by the process of this invention. There is a substantial portion of hydrogen in the inlet gas composition, as for example, in a product gas from a reforming process just upstream from the methanation process of this invention.

For temperatures in the range of 100–250° C., we prefer to employ a flow rate on the order of 100–500 cc./min., or up to 1 liter/min. where the feed gas is initially CO-free. However, it should be understood that as the flow rate of the gas through our reactor is reduced, the temperature of methanation may be reduced below 100° C. and the methanation controlled thereby. Thus, by control of the flow rate and temperature, we can control the output composition of the product gas from our process. One preferred mode of operation of the process of this invention is the production of a gas which contains substantially no carbon monoxide, and which is useful, inter alia, in ammonia synthesis plants, and for use as fuel for various types of fuel cells, both low and high temperature fuel cells.

Surprisingly, we have found that platinum electrode materials, attempted to be employed in our process as a catalyst material show substantially no activity for methanation in the low temperature range employed in our process. Similarly, the use of platinum beneficiated by small percentages of tungsten oxide also shows substantially no promotion of methanation.

The tungsten oxide used in conjunction with the noble metals is an amorphous form not characterized as $WO_3$ or $W_2O_5$, and is hereinafter termed $WO_x$ for brevity. The catalyst mixtures are prepared in accord with the detailed description below.

In contrast, we have discovered that the most effective catalyst for use in the methanation process of this invention is a ruthenium catalyst beneficiated with a synergistic amount of tungsten oxide, hereinafter referred to as $Ru+WO_x$ for brevity. The next best material functioning as a catalyst in the process of this invention is a platinum-ruthenium alloy which is beneficiated by a synergistic amount of tungsten oxide, hereinafter $Pt-Ru+WO_x$. Both $Pt-Ru+WO_x$ and $Ru+WO_x$ catalysts are termed ruthenium-containing catalysts.

Figure 1:
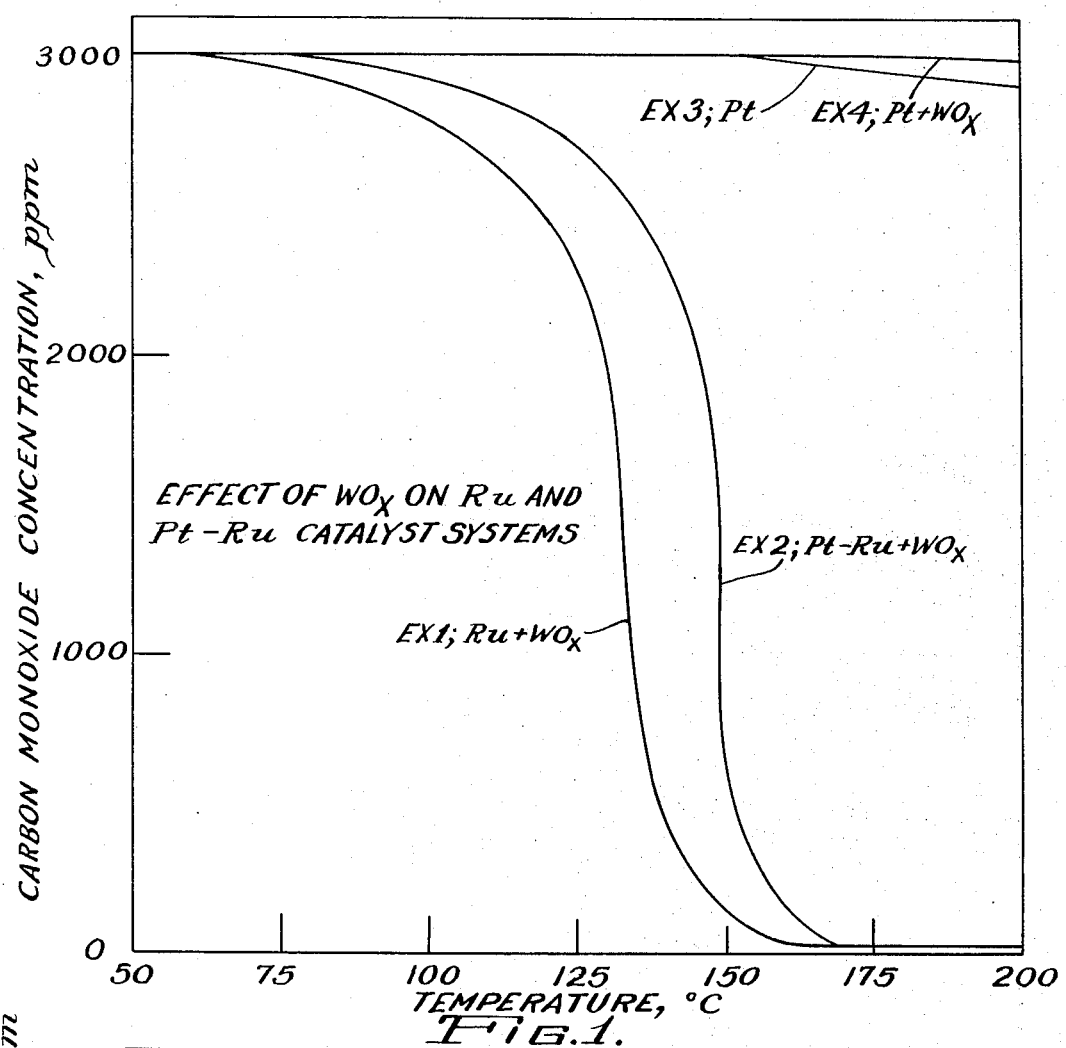
FIG. 1 is a graphical representation of the change in carbon monoxide concentration with temperature as the methanation reaction of our process is catalyzed by the synergistic effect of tungsten oxide on a ruthenium, and a ruthenium-platinum catalyst.

The $Pt-Ru+WO_x$ catalyst falls about 20° behind the $Ru+WO_x$ catalyst in terms of methanation rate effectiveness: that is, the same methanation occurs about 20° C. higher for $Pt-Ru+WO_x$ than $Ru+WO_x$. This best is illustrated in FIG. 1, which shows the activity of tungsten in ruthenium-containing catalysts. As can be seen by comparing FIGS. 1 and 2, substantially all of the carbon monoxide concentration in the inlet gas composition has been reacted at a temperature below about 165° C. The initial inlet gas composition is 0.3% carbon monoxide, i.e., 3000 p.p.m.

Figure 2:
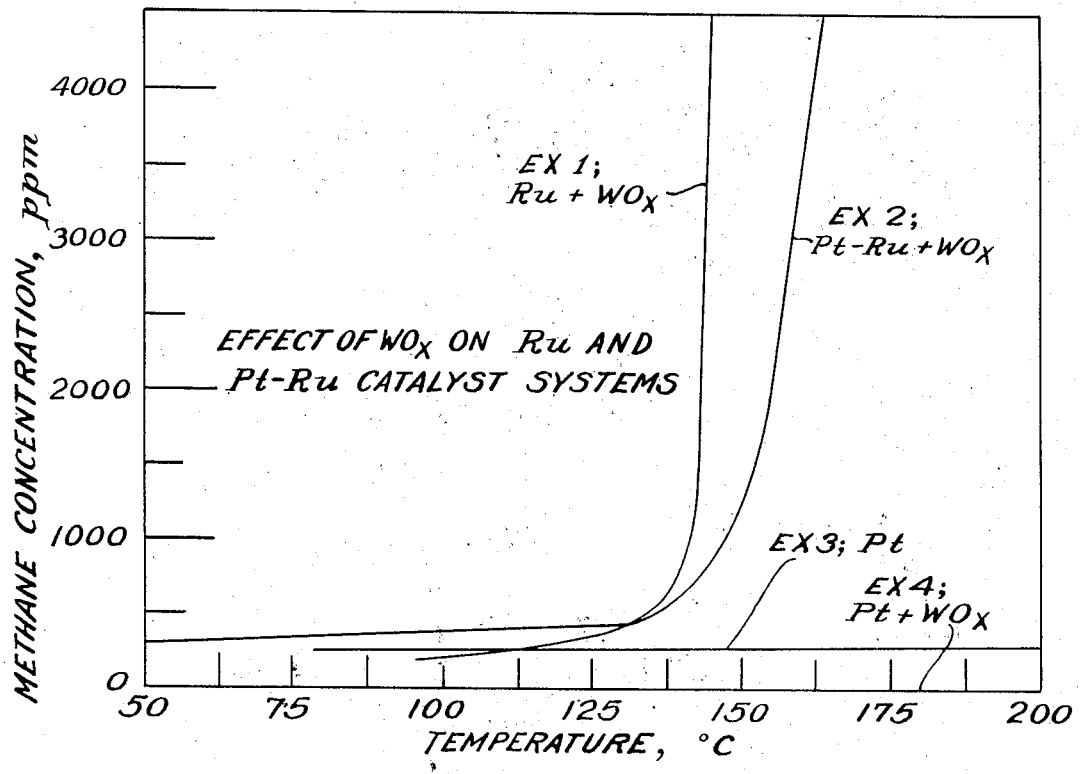
FIG. 2 is a graphical representation of the same catalyst as shown in FIG. 1 and illustrates the corresponding increase in methane concentration as a result of the sequential methanation.

The corresponding graph showing the increase in methane composition in the output gas for the Ru-containing catalysts is shown in FIG. 2. At the temperature mentioned, about 165° C., the methane concentration is substantially above 3000 p.pm. Indeed, for the $Ru+WO_x$ catalyst, the concentration exceeds 3000 p.pm. at a temperature of about 145° C., while the corresponding value for the $Pt-Ru+WO_x$ catalyst is about 160° C. Since the methane concentration continues to increase as the temperature increases, the two figures, FIGS. 1 and 2, taken together, show that the carbon monoxide is sequentially, and preferentially, selectively methanated prior to the methanation of the carbon dioxide. After the carbon monoxide is methanated, the carbon dioxide may then proceed to methanate as indicated by increase in the methane concentration in FIG. 2. Of course, in gases not containing carbon monoxide, the methanation of the carbon dioxide can proceed unhindered.

Figure 3:
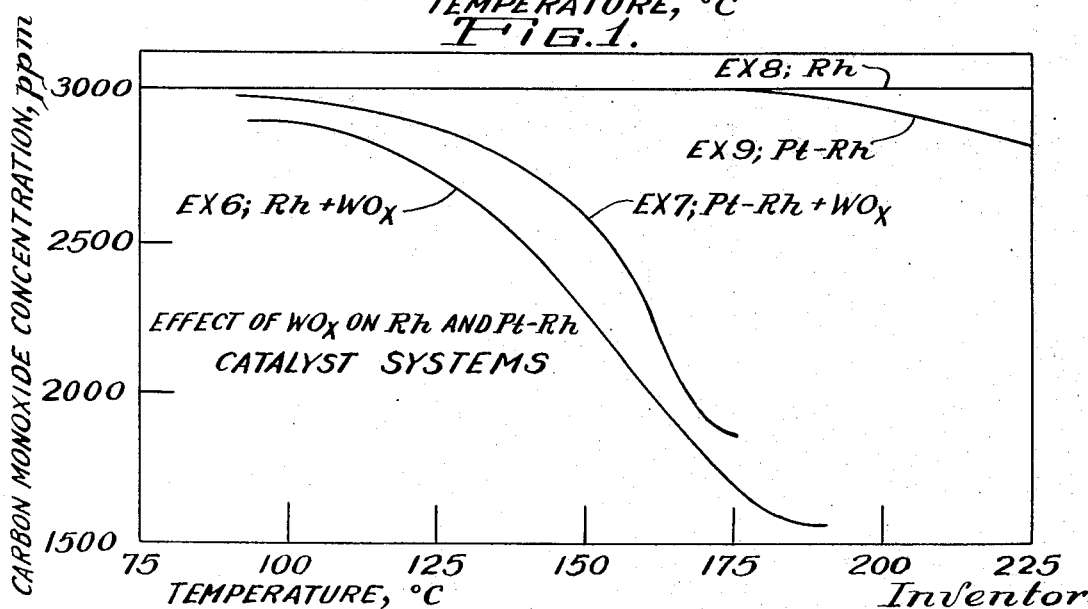
FIG. 3 shows the synergistic effect of tungsten oxide on a rhodium, and a rhodium-platinum catalyst in the methanation.
Figure 4:
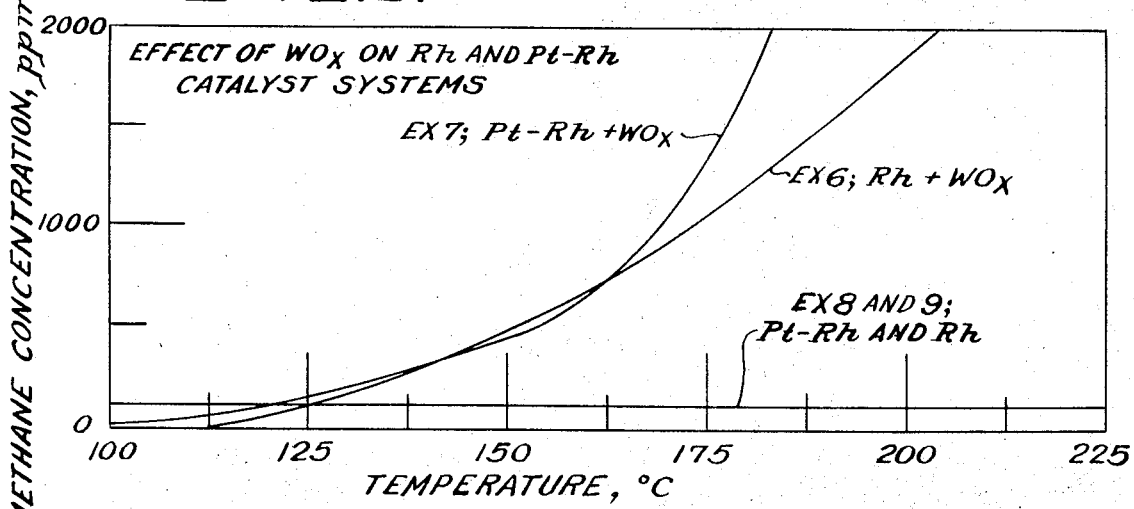
FIG. 4 shows the same catalyst as used in FIG. 3, and graphically illustrates the increase in methane concentration as a result of the process of this invention.

FIG. 3 illustrates the second catalyst system of this invention showing the synergistic methanation effect of tungsten oxide on a rhodium catalyst and on a platinum-rhodium alloy, hereinafter $Rh+WO_x$ and $Pt-Rh+WO_x$ catalysts. In addition, this figure in conjunction with FIG. 1 illustrates our discovery that platinum, platinum beneficiated by tungsten oxide, platinum-rhodium alloys, and rhodium alone, do not substantially methanate the carbon monoxide at the temperatures indicated. Thus, the Rh+WO$_x$ and Pt—Rh+WO$_x$ are highly specific as compared to Pt or Rh alone, Pt—WO$_x$ and Pt—Rh without WO$_x$. The corresponding values for the methane concentration are shown in FIG. 4.

The temperature-flow rate relationship discussed above is shown in FIG. 5 for the Ru+WO$_x$ catalyst, while FIG. 6 shows the temperature-flow rate relationship for the Pt—Rh+WO$_x$ catalyst.

As noted above, platinum and platinum beneficiated by tungsten oxide lack effectiveness in the process of this invention as methanation catalysts. Equally surprising, we have discovered that amorphous molybdenum oxide, hereinafter MoO$_x$, has no appreciable effect on methanation capabilities of both ruthenium and rhodium. This reinforces the selective and sequential methanation specificity of the catalysts of this invention.

Table 1 lists the combinations according to systems and admixtures.

TABLE 1.—CATEGORIZATION OF CATALYSTS

| | Metals | Mixed metals | Admixtures | |
|---|---|---|---|---|
| | | | WO$_x$ | MoO$_x$ |
| Rhodium system | Pt<br>Rh | Pt — Rh | Pt + WO$_x$<br>Pt — Rh + WO$_x$<br>Rh + WO$_x$ | Pt — Rh + MoO$_x$ |
| Ruthenium system | Pt<br>Ru | Pt — Ru | Pt + WO$_x$<br>Pt — Ru + WO$_x$<br>Ru + WO$_x$ | Pt — Ru + MoO$_x$ |

NOTE.—It is to be understood that the MoO is listed here for completeness only since it does not show appreciable effect on methanation capabilities of Ru and Rh.

The following description of specific examples is illustrative of our invention, with curves in FIGS. 1–6 being related to the separate examples as indicated thereon.

The metal mixtures suitable for use as the catalysts in our process can be prepared by a straightforward procedure which involves the steps of initially admixing, in an aqueous environment, an alkali metal borohydride, such as sodium borohydride or potassium borohydride, and a mixture comprising: (a) rhodium or ruthenium halide, such as rhodium or ruthenium chloride, or rhodium or ruthenium bromide and (b) ammonium or alkali metal metatungstate. There results a co-precipitated catalyst mixture containing essentially active rhodium metal as well as reduced, amorphous oxide of tungsten. The resultant mixture is combined with (a) an aqueous dispersion of binder-waterproofing agent, such as polytetrafluoroethylene, polychlorotrifluoroethylene or polyethylene and (b) mineral oil to form a catalyst mixture paste of the same.

In general, a wide range of catalyst components can be used in our process. For instance, there is contemplated utilizing from about 80% to about 95% ruthenium or rhodium, and from about 5% to about 20% reduced tungsten oxide on a weight basis. However, it has been found that for superior performance of the overall electrode a mixture comprising 85% rhodium or ruthenium and 15% reduced tungsten oxide is employed.

Advantageously, a portion of each of the aforementioned rhodium or ruthenium components may be substituted in the process of the invention. Thus not more than up to about 50% of the rhodium or ruthenium metal content may be substituted by platinum. Thus, in the preparation of the catalyst used in our process, from 0% to 30% chloroplatinic acid, 30% to 60% rhodium or ruthenium halide and 40% ammonium metatungstate can be admixed to recover a catalyst having the following composition:

| | Percent |
|---|---|
| (a) Rhodium or ruthenium | 40–95 |
| (b) Platinum | 0–47.5 |
| (c) Reduced tungsten oxide | 5–20 |

The catalyst mixture paste was spread on a supporting grid or screen of stainless, tantalum or acrylic fiber paper and let dry to form a catalyst sheet. The amount of the mixed metal catalyst is preselected to provide from 5 to 40 mg. catalyst/cm.$^2$ of the catalyst sheet. For testing purposes to best show the effectiveness at low catalyst loadings, 5 mg./cm.$^2$ was used. For the noble metals test involving Pt—Rh and Pt—Ru, the weight proportions of the Pt and the Ru or Rh were the same.

The reactors were a standard test cell having tantalum and stainless steel end plates, which were tested and found inert for the reactions. The dry catalyst sheet was placed against a .100 inch solid Teflon gasket and surrounded by a .100 inch Teflon frame gasket so that the area of the catalyst sheet was determined by the opening size of the frame gasket, in all tests 2 x 2 inch. The gasket-catalyst sheet was then secured between the end plates by bolts, and the catalyst sheet fixed in place against the solid Teflon gasket, inter alia, to prevent sagging, by means of standard expanded-metal tantalum screens in the frame gasket opening. With inlets and outlets in one end plate, the reaction presents a thin, wide chamber with one catalyzed wall. The catalyst sheet was not placed under any electrical potential and the entire cell was heated to, and maintained at the preselected temperature within the test range of 50–275° C.

In operation, either the standard test fuel gas or a reference gas (for calibrating the analyzing instrument) is admitted to the system through a pressure regulator and block valve. The gas passes through a flow-indicating rotometer and a flow regulator which control a constant, downstream flow rate, regardless of the upstream pressure. The gas then flows either to the test cell or to a bypass. Leaving the test cell, the gas goes either to a bubble flowmeter or to the gas analysis train. The bubble flowmeter is used to adjust the flow controller for each run. The gas analyzing equipment is calibrated with a reference and the standard test gas at the beginning of each run. In a given test, when the cell temperature stabilized, as controlled by a proportional temperature-indicating controller and verified by a strip-chart temperature recorder, the bypass valve is closed and the gas fed to the test cell for several minutes to establish steady-state conditions. The carbon monoxide and methane contents in the effluent gas were then recorded as a function of temperature.

The gas compositions were determined by sensitive infrared analyzers calibrated for the detection of carbon monoxide and methane. The first unit in the analysis train is a Lira Model 200, manufactured by Mine Safety Appliance, Pittsburgh, Pa. It has three carbon monoxide ranges with full-scale sensitivities of 100, 500, and 5000 p.p.m. CO. Although the lower range is direct reading, non-linearity exists in the upper two ranges so that calibration curves are required. When used with these curves, the Lira IR analyzer continuously monotors the carbon monoxide concentration in the flowing gas stream with an estimated accuracy of 2% of full scale. The analyzer used for methane determination is a Lira Model 300, which has greater electronic drift so the absolute values of the methane concentrations are somewhat greater than 2% of full scale. This unit has a single range of 0–6000 p.p.m. methane.

The gas flow rate used in most of this work was 300 cu. cm./min. except where rate of flow tests were run.

This standard flow rate indicates the relative performances of the catalysts. The average residence time in the cell is approximately ¾ second.

The primary feed gas was a simulated reformer product of 79.7% $H_2$, 20% $CO_2$, and 0.3% CO. Gas of this composition may be expected after reforming and shifting reactions with a high $H_2O/CH_4$ ratio in the feed to a reformer. In some tests, a reference gas containing 80% hydrogen and 20% carbon dioxide was used. This gas determines the effect of a carbon monoxide-free feed. Unless otherwise indicated, the tests were run with dry feed. The test runs were made over the temperature range of from 50° C. to between 175 to 250° C., and the results were plotted as a series of best curves on the accompanying FIGS. 1-6. Where the catalyst metal used an oxide additive, it was present as 15% by weight.

In general, the relative capabilities of these catalysts in promoting the reactions were determined by the change in the CO and $CH_4$ concentrations in the effluent gas stream. Any increase in the $CH_4$ concentration is indicative of methanation of CO or $CO_2$. If an increase in $CH_4$ concentration is accompanied by a corresponding decrease in the CO level, then the methanation of CO is taking place.

A decrease in the CO concentration could mean either CO was methanating, or CO plus water was shifted to $CO_2$. A corresponding increase in the $CH_4$ level indicates that it is methanation of CO which is taking place. An increase in CO content, without a change in the $CH_4$ level, indicates that the $CO_2$ was shifted to CO plus water.

The effluent from some rhodium-containing catalysts first shows a decrease in the CO content, with a corresponding increase in $CH_4$. At higher temperatures, both the CO and $CH_4$ levels increase. This illustrates the preferential selective methanation of carbon monoxide at lower temperatures, followed sequentially by the shift of $CO_2$ to CO.

EXAMPLES 1-4

FIGS. 1 and 2 show the results from runs at temperatures from 50 to 175° C. using 20% $CO_2$, 0.3% CO, 79.7% $H_2$ at 300 cc./min. as follows:

Example 1—Ru+$WO_x$ 85:15% by weight at 5 mg./cm.² loading;
Example 2—Pt—Ru+$WO_x$ 42.5:42.5:15% by weight; same loading as Example 1;
Example 3—Pt alone, same loading as Example 1;
Example 4—Pt+$WO_x$ 85:15% by weight; same loading as Example 1.

FIG. 1 shows the best curve for the data on the drop in CO concentration in the effluent and compares the Pt and $WO_x$ beneficiated Pt, with Ru+$WO_x$, and Pt—Ru alloy beneficiated with $WO_x$. The Ru+$WO_x$ is the most active while the Pt and Pt+$WO_x$ are substantially inert as methanation catalysts in our process. FIG. 2 shows the corresponding methane concentration increase. The fact that the methane values exceed 3000 p.p.m. in FIG. 2 at temperatures above 140° C. for Ru+$WO_x$ and 160 for Pt—Ru+$WO_x$, while the CO concentration (FIG. 1) is "zero" at those temperatures, shows that after the CO is substantially completely methanated, the $CO_2$ is effectively methanated at those temperatures. The activity of $WO_x$ in Ru or Pt—Ru alloys for the methanation is clear.

EXAMPLE 5

The catalyst of Example 2 was re-run using a feed of 80% $H_2$, and 20% $CO_2$ at the same flow rate, 300 cc./min. to test the direct methanation of $CO_2$ in the absence of CO. The results are as follows:

| P.p.m. methane: | Temperature |
|---|---|
| 350 | 100 |
| 1200 | 125 |
| 2375 | 140 |
| 4100 | 145 |

By comparing these values with those interpolated from Example 2 of FIG. 2, it can be seen that the methanation in the presence of CO lags behind $CO_2$ by 25-30° C. initially and this decreases to about 10° C. at values above 3000 p.p.m. This indicates that the $CO_2$ will effectively directly methanate where there is no CO in the gas, and that where CO is present, the CO selectively preferentially methanates followed sequentialy by the effective methanation of the $CO_2$.

EXAMPLES 6-9

FIGS. 3 and 4 show the results from runs at temperatures from 75° to 225° C. using the same feed and flow rate as in Examples 1-4, as follows:

Example 6—Rh+$WO_x$, 85:15% by weight, same loading as Examples 1-4;
Example 7—Pt—Rh+$WO_x$, 42.5:42.5:15% by weight, same loading as Examples 1-4;
Example 8—Rh alone, same loading as Examples 1-4;
Example 9—Pt—Rh, 50:50% by weight, same loading as Examples 1-4.

FIGS. 3 and 4 correspond to FIGS. 1 and 2 except they show the data for the rhodium family of catalyst materials. As seen from FIGS. 1 and 2, Pt and Pt+$WO_x$ are substantially inert. Likewise, Rh alone (Example 8) is inert, while Pt—Rh alloy (Example 9) is only slightly more active than the relatively inert Pt+$WO_x$, at temperatures from 175-225° C. In contrast, under the conditions of this invention, both Rh and Pt—Rh alloy have significantly increased methanation activity when beneficiated with $WO_x$. The CO concentrations for catalysts of Examples 6 and 7 increase again at high temperatures due to their effectiveness as CO shift catalysts; this effect is not illustrated herein since it is the subject of our copending application Ser. No. 68,633, filed of even date herewith.

EXAMPLES 10-17

FIGS. 5 and 6 show the control of the output gas composition for Ru+$WO_x$ catalyst of Example 1, and the Pt—Rh+$WO_x$ catalyst of Example 7, utilizing the feed gas of Example 1-4 and 6-9 as follows:

| Example | Catalyst | Flow rate, cc./min. |
|---|---|---|
| 10 | Ru+$WO_x$ 85:15 | 100 |
| 11 | Ru+$WO_x$ 85:15 | 150 |
| 12 | Ru+$WO_x$ 85:15 | 300 |
| 13 | Ru+$WO_x$ 85:15 | 500 |
| 14 | Pt—Rh+$WO_x$ 42.5:42.5:15 | 100 |
| 15 | Pt—Rh+$WO_x$ 42.5:42.5:15 | 150 |
| 16 | Pt—Rh+$WO_x$ 42.5:42.5:15 | 300 |
| 17 | Pt—Rh+$WO_x$ 42.5:42.5:15 | 500 |

As can be seen from the results in FIGS. 5 and 6, the CO content of the output gas decreases (and correspondingly, but not shown, the methane content increases), can be determined by preselected control of the temperature and flow rate. Where high flow rate is used, the CO content can be simply controlled by selecting temperature between about 75 through 190° C. (FIG. 5). Conversely, where a given temperature is preselected to be held constant, say 140° C., the flow rate can be cut down from 500 to 100, to cut the exit gas p.p.m. of CO from about 2000 to substantially zero. FIG. 6 shows the comparable values for the Pt—Rh+$WO_x$ catalyst system process control, and in addition, shows that the total methanation capability of the catalyst improves with decrease in flow rate, indicating that residence time in the reactor is a control parameter. For a 300 cc./min. flow rate in the test cell, the reactor residence time is about ¾ second, and this residence time may be varied from about 1/100 second to 5 seconds. In the case of CO-free feed, the $CO_2$ will methanate in a pattern of flow rate-temperature curves similar to the curves of FIGS. 5 and 6.

EXAMPLES 18–21 (COMPARISON)

In Example 3 of U.S. Pat. 3,357,863, the patentee shows the performance of Pt and Pt—Rh+$WO_x$ formed into fuel cell electrodes (anodes) in a phosphoric acid fuel operating at 150° C. upon a CO containing fuel. To point up the unexpectedness of the novel use of the metal compositions in the process of this invention, comparison tests were made using both Pt (Example 18) and Pt—Rh+$WO_x$ (Example 19) catalyst sheets as prepared above in Examples 3 and 2 respectively under electrical conditions equivalent to those of the fuel cell shown in that Example 3 of U.S. Pat. 3,357,863, as follows.

The test cell size used in these two comparative examples was two inch by two inch, the same as used above. The cell was placed under a 2.78 amp current drain at a current density of 100 a./sq. ft. The feed gas was as specified above, 0.3% CO, 20% $CO_2$ and 79.7% $H_2$, and was fed in at 107 cu. cm./min. The effluent gas was exhausted from the test cell at a rate of 86 cu. cm./min. The cell was operated at 150° C., and employed a 20 milligram Pt/$cm^2$ cathode operating on oxygen as the oxidant. The methane and CO in the anode effluent were measured at steady state conditions after several hours of operation.

Both the Pt and the Pt—Rh+$WO_x$ sheets, acting as anodes under the electrical conditions of these comparative test runs, Examples 18 and 19 respectively, showed no methanation under the steady state operating conditions. Likewise, the anodes showed no significant change in the CO concentration in the fuel cell effluent, based on the close agreement of the measured CO concentration in the effluent with the value predicted by material balance. CO must be evaluated with reference to material balance since hydrogen is consumed in the manufacture of the electricity in the test fuel cell.

Although there was no net effective chemical reaction in the operating fuel cell, the electrochemical performance of the fuel cell of Example 18 differed significantly from that of Example 19. Both cells started at relatively low polarizations when switched from hydrogen to the CO-containing fuel. Polarization increased rapidly for both cells and leveled out at a value of about 40 millivolts for the pure platinum anode of Example 18. In the case of the mixed metal anode of Example 19, Pt—Rh+$WO_x$, the polarization maximized and then decreased to about 15 millivolts after prolonged operation. The polarization effect due to the dilution of the hydrogen with 20% carbon dioxide in this fuel cell is 13 millivolts, indicating that the net polarization due to poisoning by carbon monoxide was quite low on the anode of this comparative example.

Further runs were then made on the same sheet structure when they were not operating under electrical conditions as anodes in the test fuel cells. The Pt sheet of Example 18 was used in the 2 x 2 inch test reactor described above and run as Example 20, while the Pt—RH+$WO_x$ catalyst sheet was run as Example 21, both using the feed of Examples 1–4. The methane and carbon monoxide concentrations from the anodes were determined. The pure platinum catalyst of Example 18 was essentially inert for the methanation, which agreed with the results of Example 3. The mixed Pt—Rh+$WO_x$ catalyst, however, was quite active in the manufacture of methane at 150° C., confirming the results of Example 2, although total carbon monoxide consumption and methane production at the flow rate of 100 cu. cm./min. did not equal that of Example 2.

In the tests of Examples 18–21, the feed gas used was that of Examples 1–4 having 3000 p.p.m. CO. While this gas was not identical to that of U.S. Pat. 3,357,853, the tests are entirely comparable because of the lower metal loading used in our catalyst and "anode" sheets. The patent calls for 20–40 mg./$cm^2$ loading for CO concentrations over 1% and 5 mg./$cm^2$ for 100 p.p.m. In the above comparative tests, Examples 18–21, we use only 5 mg./$cm^2$ at a CO concentration which is 30× the maximum indicated in the patent.

These results, Examples 2, 3, 21 and 20, compared to Examples 19 and 18, show that by the present use of the metals compositions under electrical conditions, they do not effectively methanate the CO and/or $CO_2$ in the feed gas. Based on this, our discovery of selective, preferential and sequential methanation in the process of this invention is quite unexpected.

In addition to the catalyst sheets used in the specific examples above, the catalysts of this invention may be used in other forms, for example, deposited on alumina supports in granular, spherical, cylindrical or "saddle" forms. Likewise, other modifications may be made in the process of our invention without departing from the spirit thereof.

We claim:

1. A process of methanating a feed gas containing hydrogen and a gas selected from CO, $CO_2$ and mixtures thereof comprising the steps of:
   (a) passing said feed gas into contact with a catalyst in a reaction chamber, said catalyst consisting essentially of ruthenium, with from 0–50% of said ruthenium substituted by platinum, and from 5–20% reduced amorphous oxide of tungsten,
   (b) heating said chamber to a temperature within the range of 75–250° C.,
   (c) maintaining said feed gas in said chamber for a period of time sufficient to methanate said CO, $CO_2$ or mixtures thereof, and
   (d) removing an exhaust gas comprising methane from said chamber.

2. A methanation process as in claim 1 wherein said feed gas is fed into said chamber at a rate of up to about 1 liter/min.

3. A methanation process as in claim 2 wherein said feed gas flow rate is from 100–500 cc./min.

4. A methanation process as in claim 3 wherein said tungsten oxide is present in an amount of about 15% by weight.

5. A methanation process as in claim 1 wherein said feed gas contains both CO and $CO_2$.

6. A methanation process as in claim 1 wherein said feed gas contains no CO.

References Cited

UNITED STATES PATENTS

| | | | |
|---|---|---|---|
| 3,271,326 | 9/1966 | Forney et al. | 260—449 R |
| 1,735,925 | 11/1929 | Jaeger | 260—449 R |
| 1,831,179 | 11/1931 | Jaeger | 260—449 R |
| 3,351,564 | 11/1967 | Faatz et al. | 260—449 R |
| 3,407,032 | 10/1968 | Ziering | 423—606 |

FOREIGN PATENTS

| | | | |
|---|---|---|---|
| 807,584 | 1/1959 | Great Britain | 260—449 M |

OTHER REFERENCES

Shultz et al.: Bureau of Mines, Report of Investigations, No. 6974, July 1967, U.S. Dept. of Interior.

HOWARD T. MARS, Primary Examiner

U.S. Cl. X.R.

252—467, 470